United States Patent [19]

Tabacchi

[11] Patent Number: 4,600,279
[45] Date of Patent: Jul. 15, 1986

[54] FRAME FOR EYEGLASSES WITH INTERCHANGEABLE NOSE REST MEMBERS

[76] Inventor: Vittorio Tabacchi, VII Strada n. 20,, 35100 Padua, Italy

[21] Appl. No.: 438,047

[22] Filed: Nov. 1, 1982

[51] Int. Cl.$^4$ ............................................. G02C 5/12
[52] U.S. Cl. ..................................... 351/137; 351/132
[58] Field of Search .................. 351/137, 138, 77, 76, 351/80, 128, 131, 133

[56] References Cited

U.S. PATENT DOCUMENTS

| | | | |
|---|---|---|---|
| 1,808,448 | 6/1931 | Baker | 351/137 |
| 3,345,121 | 10/1967 | De Angelis | 351/137 |
| 4,205,905 | 6/1980 | Abel et al. | 351/132 |

Primary Examiner—Rodney B. Bovernick
Attorney, Agent, or Firm—Howard I. Schuldenfrei

[57] ABSTRACT

In an eyeglass frame comprising a front piece formed of two rings arranged side by side serving to hold a pair of lenses and of a bridge which connects the two rings together, two stems protruding towards the inside of the frame are fastened to the inner sides of the two rings. The two stems are provided with attachment appendages which extend downward and are adapted to be engaged, with pressure-fit, by interchangeable nose rest members of different type. The attachment appendages of the two stems are plastically deformable as a result of the introduction of the preselected nose rest members.

1 Claim, 7 Drawing Figures

FRAME FOR EYEGLASSES WITH INTERCHANGEABLE NOSE REST MEMBERS

BACKGROUND OF THE INVENTION

The present invention relates to eyeglass frames of the type comprising a front member formed of two rings arranged alongside of each other and serving to hold a pair of lenses and of a bridge which connects the inner sides of the two rings.

In general, frames of this type are also provided with nose rest members applied to the inner sides of the two rings in a position below the bridge. These nose rest members, the function of which is to assure a firm retention of the frame on the nose of the wearer, may be of different shapes depending on the aesthetic and functional demands made on the frame. The nose rest members which are at present most widely used for reasons of simplicity and practicality in use consist essentially of two types, namely so-called "nose pads," formed specifically of a pair of separate pads adapted to rest on the sides of the nose, and so-called "nose pieces", formed of a pair of lateral rest pads connected together on top by a small front resting bridge. The first type is particularly suitable for long noses while the second type is more advantageous for thin and small noses.

The manufacturers of eyeglass frames are therefore compelled to provide, for each type of frame produced, two different versions with nose rests of the pad type and of the nose piece type respectively. This evidently entails substantial complications in construction, with consequent constraints in production as well as problems in stocking the different versions of the frames.

The object of the present invention is to obviate the said drawbacks and to provide an eyeglass frame of the type defined above which can be easily and rapidly fitted to noses of different shape.

SUMMARY OF THE INVENTION

In accordance with the invention, this purpose is achieved in the manner that to the inner sides of the two rings of the frame there are fastened two stems which protrude inwardly from the frame, each having an attachment appendage which extends downward, and that the frame is furthermore provided with interchangeable nose rest means of different type adapted to be attached selectively by pressure fit with the said attachment appendages.

In this way it is possible to produce, for each particular form of frame, a single version which can be easily fitted to the shape of the nose of the user by the seller or the user himself at the time of purchase. The conformation of the frame, as a matter of fact, makes it possible to try on the various nose rest means which may be interchanged in a few seconds, selecting those which are best suited.

According to the invention, the attachment appendages of the two stems are inelastically deformable. This characteristic makes it possible, after having mounted the said nose rest means, to bring said rest means towards and away from each other so as to obtain the shape which is best adapted to the shape of the nose of the user.

In accordance with another feature of the invention, the attachment appendage of each stem is provided with external holding ridges.

This feature assures firm anchoring of the nose rest means after repeated application and removal thereof.

In accordance with the invention, the nose rest means comprise a first pair of nose pads which are separate from each other and a second pair of nose pads which are interconnected by a small arcuate bridge (nose piece), each nose pad of each pair being provided with a recess which serves for the insertion by force of the attachment appendage of a corresponding stem.

In order to permit a correct fit to the nose of the user, the two nose pads of the second pair are connected to the corresponding bridge by elastically deformable portions.

BRIEF DESCRIPTION OF THE DRAWINGS

Further characteristics and advantages of the invention will become evident from the following detailed description, given with reference to the accompanying drawings which are provided purely by way of illustration and not of limitation and in which.

DETAILED DESCRIPTION OF THE INVENTION

Figure 1:
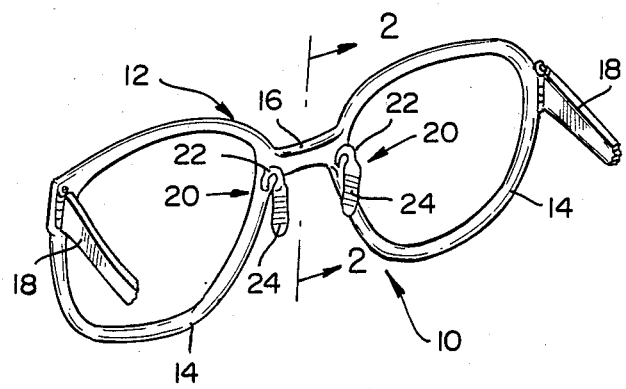
FIG. 1 is a diagrammatic perspective view of an eyeglass frame in accordance with the invention.
Figure 2:
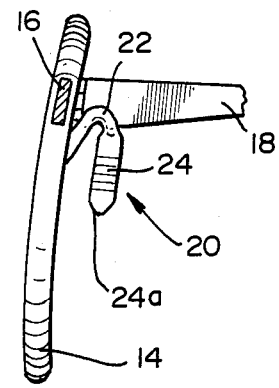
FIG. 2 is a view in cross section through the frame along the line 2—2 of FIG. 1.

Referring, first of all, to FIG. 1, 10 indicates generally a metal frame for eyeglasses.

The frame 10 consists essentially of a front piece 12 formed of two rings 14 arranged alongside of each other and adapted to receive a pair of lenses and of a bridge 16 which connects the inner sides of the two rings 14 together. To the upper region of the outer side of each ring 14 there is hinged a corresponding bar 18 which serves for the resting of the frame 10 on the ear of the user.

Figure 3:
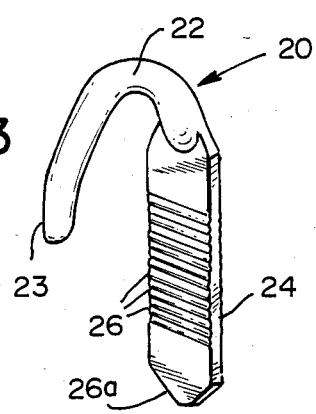
FIG. 3 is a perspective view on larger scale of a detail of the frame.

20 are two stems of substantially hook shape fastened to the inner sides of the two rings 14 near the bridge 16 and protruding inward from the frame 10. Each stem 20 is preferably of metal and, as clearly shown in FIG. 3, comprises a curved base portion 22 and a flattened attachment portion 24. The base portion 22 is of circular cross section and is provided near its free end with a flat side surface 23 used for attachment to the front piece 10. This attachment may be effected by soldering, bonding or any other suitable method.

The attachment part 24, as seen in cross section, has a downwardly elongated rectangular shape and is provided with a narrowed free end 24a.

On both the larger side surfaces of the attachment part 24, above the narrowed end 26a and up to a short distance from the base portion 22, there are provided retention ridges 26 formed of a plurality of contiguous transverse grooves.

Figure 4:
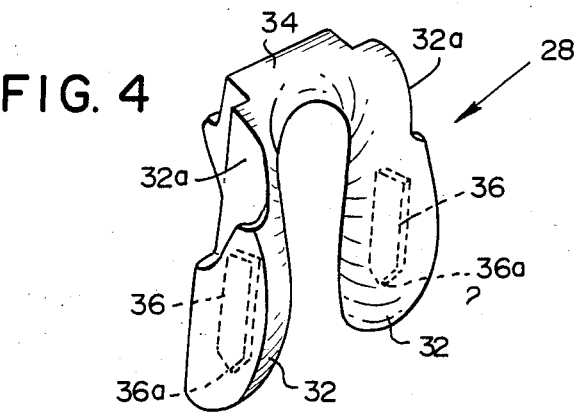
FIGS. 4 and 5 are two perspective views on a larger scale illustrating the interchangeable nose rest means of the frame.
Figure 5:
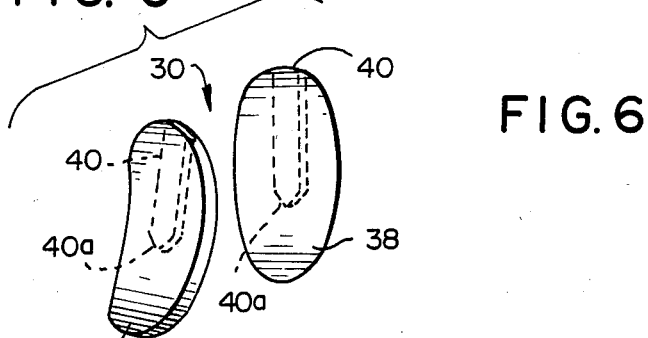

The attachment parts 24 of the two stems 20 are adapted to be engaged optionally by first and second nose rest members which are interchangeable with each other, indicated by 28 in FIG. 4 and by 30 in FIG. 5 respectively, which accompany the frame of the invention.

The first nose rest member 28 consists of a single piece of molded soft plastic material having, in general, the shape of an inverted U. This member 28, known as the "nose piece," is in fact formed of a pair of rounded nose pads 32 connected together on top, via respective portions 32a of reduced cross section, by a small arcuate bridge 34. The two nose pads 32 are provided with axial recesses 36 which are open on the top and have a shape complementary to that of the attachment portions 24 of the stems 20, the lower ends of the recesses, indicated by 36a, being narrowed like the lower ends 26a of the said attachment parts 24.

The bridge 34 has a front surface which is shaped so as to engage the bridge 16 of the front member 10 in form-locked manner, as more clearly explained during the course of the description.

The second nose rest member 30 is, on the other hand, formed simply of a pair of nose pads of rounded shape 38 which are separate from each other and also produced by molding from a soft plastic material. The two nose pads 38 are both provided with recesses 40 which are open at the top, entirely similar to the recesses 36, with narrowed ends 40a.

Figure 6:
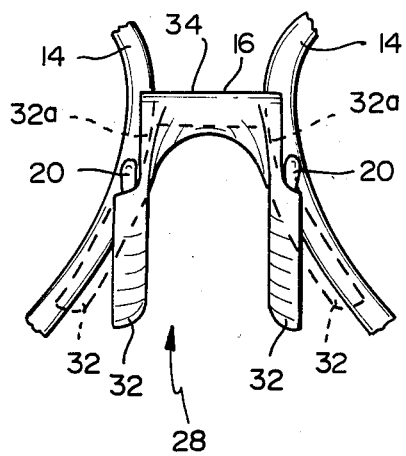
FIG. 6 is a partial diagrammatic front view of the frame with the nose rest means of FIG. 4.
Figure 7:
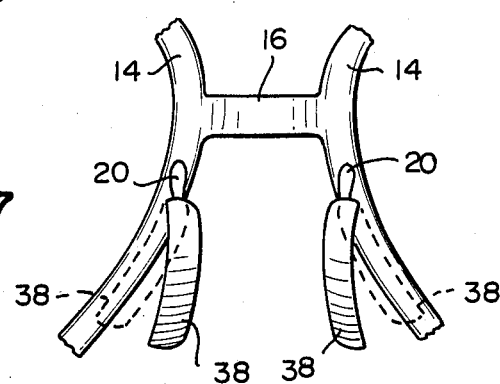
FIG. 7 is a view similar to FIG. 4 which illustrates the frame with the nose rest means of FIG. 5.

FIGS. 6 and 7 respectively show the nose piece 28 and the two nose pads 38 applied to the frame 10. In both cases, the mounting is effected by initially bringing the attachment parts 24 of the stems 20 into relatively parallel position in the manner illustrated in FIG. 1. For the insertion of the nose piece 28 it is sufficient to introduce the two attachment parts 24 into the two recesses 36 and push the nose piece 28 in so as to bring the small bridge 34 into engagement with the bridge 16. In this way there is obtained a force-fit of the attachment parts 24 in the two recesses 36 and the strength of this connection is assured by the presence of the ridges 26. At this point, in order to fit the nose piece 28 to the shape of the nose of the user, it is sufficient to deform the two attachment parts 24, for instance by moving the two rest pads 32 away from each other in the manner illustrated in dashed line in FIG. 6.

In order to remove the nose piece 28 and replace it by the two nose pads 38 it is sufficient to bring the attachment parts 24 into the initial position shown in solid line in FIG. 6 and then pull the nose piece 28 down until the attachment parts 24 are disengaged from the recesses 36.

The application of the two nose pads 38 is effected in entirely similar manner, obtaining a force-fit of the attachment parts 24 within the corresponding recesses 40. In this case also, the frame can easily and rapidly be adapted to the shape of the nose of the user by deforming the attachment parts 24 with respect to the base portions 22 of the stems 20 by pushing the nose rest pads 38 between the position shown in solid line in FIG. 7 and the position shown in dashed line in the same figure.

From the foregoing description it is obvious that the frame of the invention, in addition to being extremely simple to manufacture as well as strong and economical, is particularly comfortable, practical and functional.

Of course, without going beyond the principle of the invention, the details of construction and shape can be varied widely as compared with what has been described and shown, without thereby going beyond the scope of the present invention. Thus, for instance, it is clear that the frame of the invention could be provided, in addition to or in replacement of the nose piece 28 and the nose pads 38, with other nose rest members of different shape, adapted to be inserted, by the means described above, into the two stems 20.

What is claimed is:

1. In an eyeglass frame of the type having a front piece formed of two rings arranged alongside each other serving to hold a pair of lenses and a bridge for connecting the inner sides of the two rings together, means for interchangeably connecting different types of nose rest members to the bridge comprising, a pair of substantailly hook shaped stems, each being connected respectively to the inner side of a ring near to the bridge, the stems protruding inward from the frame and comprising a curved base portion of circular cross-section and a flattened portion for connecting the stems to the front piece of the frame and a downwardly extending, inelastically deformable attachment appendage of elongated rectangular shape having a narrowed free end and external holding ridges consisting of retention ridges formed of a plurality of contiguous transverse furrows in the larger surfaces of the attachment appendages for a tongue in groove form-locked fit into interchangeable nose rest members.

* * * * *